US010746016B2

(12) United States Patent
Barry et al.

(10) Patent No.: US 10,746,016 B2
(45) Date of Patent: Aug. 18, 2020

(54) TIME DIVISION MULTIPLEXING OF DISTRIBUTED DOWNHOLE SENSING SYSTEMS

(71) Applicants: Alexander Michael Barry, Cypress, TX (US); William Albert Johnston, Houston, TX (US); Ian Mitchell, Katy, TX (US)

(72) Inventors: Alexander Michael Barry, Cypress, TX (US); William Albert Johnston, Houston, TX (US); Ian Mitchell, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/106,307

(22) Filed: Aug. 21, 2018

(65) Prior Publication Data
US 2020/0063550 A1 Feb. 27, 2020

(51) Int. Cl.
E21B 47/06 (2012.01)
E21B 47/07 (2012.01)
E21B 49/00 (2006.01)
G01H 9/00 (2006.01)
G01K 11/32 (2006.01)

(52) U.S. Cl.
CPC .............. E21B 47/07 (2020.05); E21B 49/00 (2013.01); G01H 9/004 (2013.01); G01K 11/32 (2013.01)

(58) Field of Classification Search
CPC ....... E21B 47/065; E21B 49/00; G01H 9/004; G01K 11/32
See application file for complete search history.

(56) References Cited

U.S. PATENT DOCUMENTS

| 6,728,165 B1 * | 4/2004 | Roscigno ............... G01H 9/004 181/102 |
| 9,244,009 B2 | 1/2016 | Handerek |
| 9,915,579 B1 * | 3/2018 | Brower ................ G01L 11/025 |
| 2009/0310642 A1 | 12/2009 | Skinner et al. |

(Continued)

FOREIGN PATENT DOCUMENTS

| WO | 2009092436 A1 | 7/2009 |
| WO | 2017125717 A1 | 7/2017 |

OTHER PUBLICATIONS

International Search Report, International Application No. PCT/US2019/046486, dated Dec. 2, 2019, Korean Intellectual Property Office; International Search Report 3 pages.

(Continued)

Primary Examiner — Amine Benlagsir
(74) Attorney, Agent, or Firm — Cantor Colburn LLP

(57) ABSTRACT

Downhole fiber optic interrogation systems are described. The systems include a fiber optic control system, a first sensing system, a second sensing system, an optical fiber disposed within a well, and an optical switch arranged between the optical fiber and the first and second sensing systems, wherein the fiber optic control system performs time division multiplex control of the optical switch wherein the first sensing system is operably connected to the optical fiber and the second sensing system is not connected to the optical fiber, and further controls the optical switch such that the second sensing system is operably connected to the optical fiber and the first sensing system is not connected to the optical fiber.

16 Claims, 4 Drawing Sheets

(56) References Cited

U.S. PATENT DOCUMENTS

| | | | |
|---|---|---|---|
| 2010/0117830 A1* | 5/2010 | Strong | G01H 9/004 |
| | | | 340/555 |
| 2016/0003648 A1* | 1/2016 | Barfoot | G01D 5/35338 |
| | | | 250/227.19 |
| 2018/0283171 A1* | 10/2018 | Bhongale | H04J 14/02 |

OTHER PUBLICATIONS

International Written Opinion, International Application No. PCT/U62019/046486, dated Dec. 2, 2019, Korean Intellectual Property Office; International Written Opinion 9 pages.

* cited by examiner

TIME DIVISION MULTIPLEXING OF DISTRIBUTED DOWNHOLE SENSING SYSTEMS

BACKGROUND

1. Field of the Invention

The present invention generally relates to downhole tools and more particularly to fiber optic systems of downhole operations and methods and apparatuses for controlling the fiber optic systems.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Downhole tools and components are subject to various environmental conditions, operational conditions, and other events. As such, the downhole components may be subject to wear, fatigue, damage, etc. Accordingly, it may be advantageous to have monitoring systems and processes to monitor the health of the downhole components. Further, different data and information may be desired to be obtained during such downhole operations. One mechanism for obtaining such data is through the use of optical fibers that are disposed downhole and interrogated from the surface. The optical data can be used to extract information regarding temperature, acoustic properties, stresses, strains, or other information. Each of these data sets may require similar or identical wavelengths of light transmitted downhole, but the processing to obtain the appropriate data may be different. Thus, performing simultaneous interrogation may be difficult. Improved interrogation and fiber optic systems may thus be desirable.

SUMMARY

Disclosed herein are systems and methods related to fiber optic interrogation systems. The systems include a fiber optic control system, a first sensing system, a second sensing system, an optical fiber disposed within a well, and an optical switch arranged between the optical fiber and the first and second sensing systems, wherein the fiber optic control system performs time division multiplex control of the optical switch wherein the first sensing system is operably connected to the optical fiber and the second sensing system is not connected to the optical fiber, and further controls the optical switch such that the second sensing system is operably connected to the optical fiber and the first sensing system is not connected to the optical fiber.

The methods for interrogating one or more optical fibers disposed downhole include operably connecting a fiber optic control system, a first sensing system, a second sensing system, and an optical switch to the one or more optical fibers, switching which of the first sensing system and the second sensing system is operably connected to the one or more optical fibers through the optical switch through time division multiplex control.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
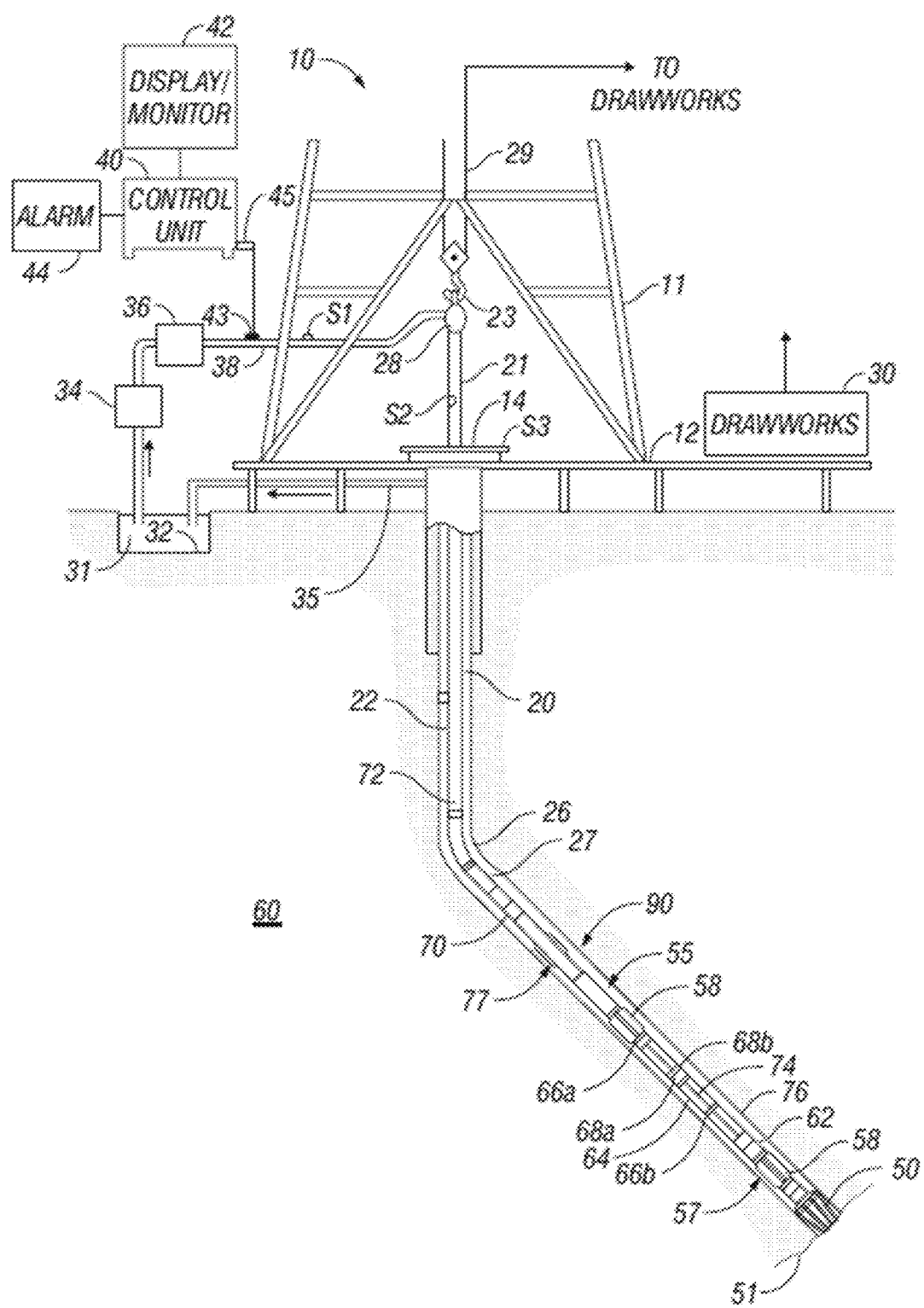
FIG. 1 is an example drilling system that can employ embodiments of the present disclosure.

FIG. 1 shows a schematic diagram of a drilling system 10 that includes a drill string 20 having a bottomhole assembly (BHA) 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes drill pipe 22 (e.g., a drilling tubular) extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to a drawworks 30 via a kelly joint 21, swivel 28 and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the BHA 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The BHA 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the BHA 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A sensor 43 (e.g., a transducer) placed in the mud supply line 38 detects the mud pulses responsive to the data transmitted by the downhole telemetry 72. Sensor 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electro-magnetic telemetry system, a wireless telemetry system that may utilize repeaters in the drill string or the borehole and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive or resonant coupling methods. In case a coiled-tubing is used as the drill pipe 22, the data communication link may be run along a side of the coiled-tubing.

The drilling system described thus far relates to those drilling systems that utilize a drill pipe to conveying the BHA 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Figure 2:
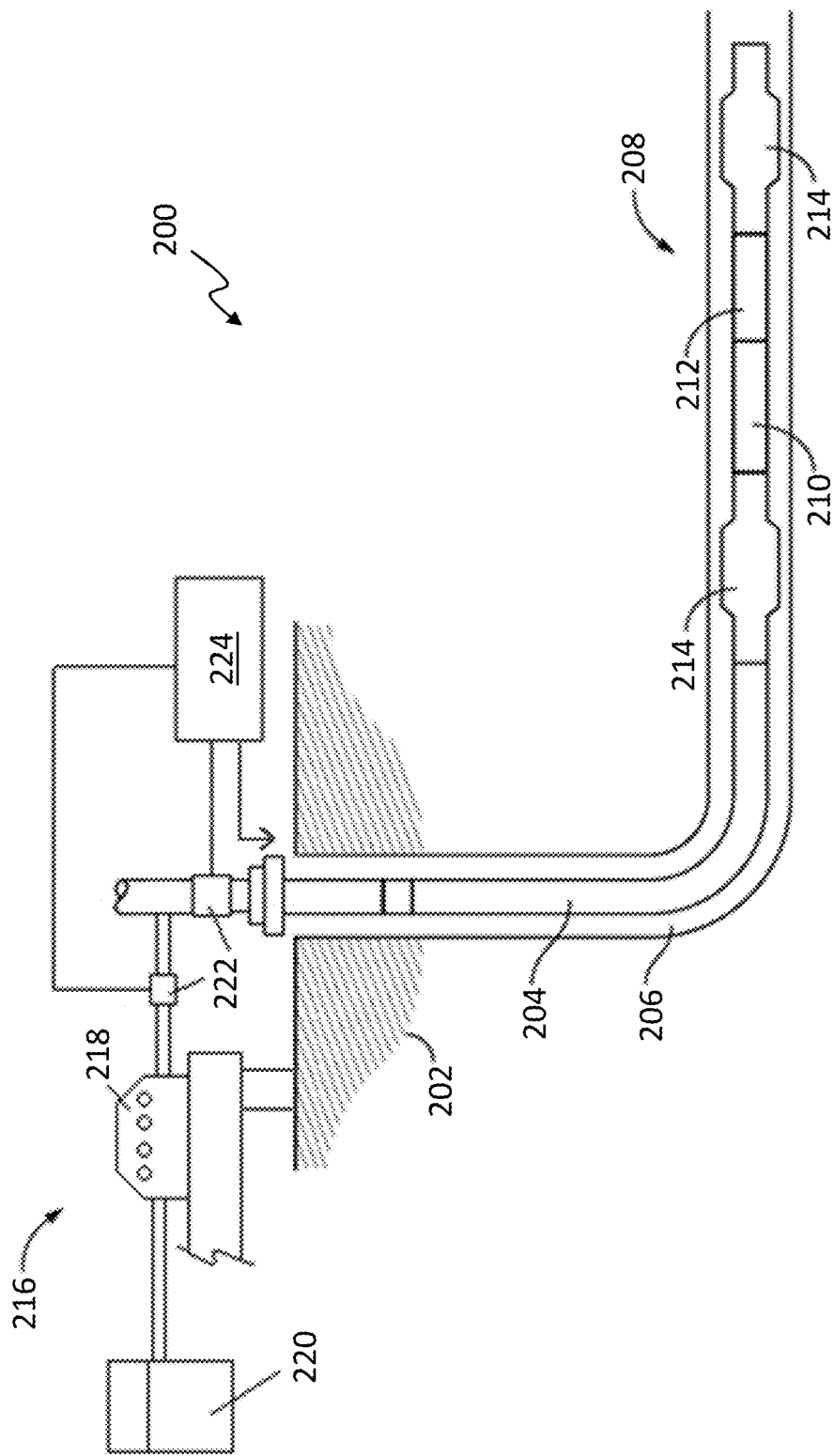
FIG. 2 depicts a system for formation stimulation and hydrocarbon production that can incorporate embodiments of the present disclosure.

Turning now to FIG. 2, a schematic illustration of an embodiment of a system 200 for hydrocarbon production and/or evaluation of an earth formation 202 that can employ embodiments of the present disclosure is shown. The system 200 includes a borehole string 204 disposed within a borehole 206. The string 204, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 200 is configured as a hydraulic stimulation system. As described herein, "stimulation" may include any injection of a fluid into a formation. A fluid may be any flowable substance such as a liquid or a gas, or a flowable solid such as sand. In such embodiment, the string 204 includes a downhole assembly 208 that includes one or more tools or components to facilitate stimulation of the formation 202. For example, the string 204 includes a fluid assembly 210, such as a fracture or "frac" sleeve device or an electrical submersible pumping system, and a perforation assembly 212. Examples of the perforation assembly 212 include shaped charges, torches, projectiles, and other devices for perforating a borehole wall and/or casing. The string 204 may also include additional components, such as one or more isolation or packer subs 214.

One or more of the downhole assembly 208, the fracturing assembly 210, the perforation assembly 212, and/or the packer subs 214 may include suitable electronics or processors configured to communicate with a surface processing unit and/or control the respective tool or assembly. A surface system 216 can be provided to extract material (e.g., fluids) from the formation 202 or to inject fluids through the string 204 into the formation 202 for the purpose of fracing.

As shown, the surface system 216 includes a pumping device 218 in fluid communication with a tank 220. In some embodiments, the pumping device 218 can be used to extract fluid, such as hydrocarbons, from the formation 202, and store the extracted fluid in the tank 220. In other embodiments, the pumping device 218 can be configured to inject fluid from the tank 220 into the string 204 to introduce fluid into the formation 202, for example, to stimulate and/or fracture the formation 202.

One or more flow rate and/or pressure sensors 222, as shown, are disposed in fluid communication with the pumping device 218 and the string 204 for measurement of fluid characteristics. The sensors 222 may be positioned at any suitable location, such as proximate to (e.g., at the discharge output) or within the pumping device 218, at or near a wellhead, or at any other location along the string 204 and/or within the borehole 206.

A processing and/or control unit 224 is disposed in operable communication with the sensors 222, the pumping device 218, and/or components of the downhole assembly 208. The processing and/or control unit 224 is configured to, for example, receive, store, and/or transmit data generated from the sensors 222 and/or the pumping device 218, and includes processing components configured to analyze data from the pumping device 218 and the sensors 222, provide alerts to the pumping device 218 or other control unit and/or control operational parameters, and/or communicate with and/or control components of the downhole assembly 208. The processing and/or control unit 224 includes any number of suitable components, such as processors, memory, communication devices and power sources.

In the configurations of FIGS. 1-2, downhole components can include electronic modules or electronic devices that are used for various functions, including, but not limited to, control functions, monitoring functions, communication functions, etc. The electronics can be mounted along the downhole strings and/or mounted or carried on other devices or instruments conveyed downhole. For example, different sections of tubing, piping, bottomhole assemblies, and/or other downhole structures (e.g., housings, casings, support structures, frames, probe sections, etc.), can include various electronic elements and/or sensors that may be used for interrogation, measurement, investigation, control, communication, or otherwise employed, as will be appreciated by those of skill in the art. In some configurations, multiple wells may be arranged in a field such that multiple instances of drilling, production, exploration, and/or investigation may be performed simultaneously, as will be appreciated by those of skill in the art.

The systems, whether in single well or in a field arrangement, may include one or more fiber optic systems/components configured to perform various functions, such as investigation and/or interrogation. The fiber optic systems may be provided for multi-function, such as communication and sensing various parameters downhole. For example, fiber optic communication cables may be arranged along tubulars or otherwise disposed downhole for transmitting data and commands between two or more downhole components and/or between one or more downhole components and one or more surface components such as a surface processing units. The same fiber optic cables, or other fiber optic cables, may be arranged as fiber optic sensors configured to measure downhole properties such as temperature, pressure, downhole fluid composition, stress, strain, and deformation of downhole components. The optical fiber components can be configured as optical fiber communication lines configured to send signals along the cables or fibers between components and/or between components and the surface.

Such fiber optic systems typically includes a fiber optic control system, such as an optical fiber monitoring system, that is configured to interrogate one or more of the optical fibers/cables to estimate a downhole parameter (e.g., temperatures, acoustic properties, strain, etc.). The fiber optic control systems may be configured as distinct/discrete systems or incorporated into other systems, which are typically located at the surface. In a field arrangement, a single fiber optic control system may be arranged in communication with multiple different fibers/cables (generically referred to herein as "optical fiber") which in turn may be disposed down multiple different wells/boreholes. For example, the fiber optic control system may be connected to optical fiber components such as communication fibers and temperature, vibration, and/or strain sensing fibers. Examples of monitoring systems include Extrinsic Fabry-Perot Interferometric (EFPI) systems, optical frequency domain reflectometry (OFDR), and optical time domain reflectometry (OTDR) systems.

The fiber optic control system typically includes a source for transmitting optical light along the optical fibers and one or more detectors for receiving reflected optical light that returns up the optical fibers. In one non-limiting example, such fiber optic control systems include a reflectometer unit configured to transmit an electromagnetic interrogation signal into the optical fiber and receive a reflected signal from one or more locations in the optical fiber. The reflectometer unit is operably connected to one or more optical fibers and includes an electromagnetic interrogation signal source (e.g., a pulsed light source, LED, laser, etc.) and an electromagnetic signal detector. In some embodiments, the reflectometer unit may include a processor that is in operable communication with the signal source and/or the detector and may be configured to control the source and receive reflected signal data from the detector. In other embodiments, a system processor may provide the features and processes just described. In some embodiments, the reflectometer unit includes, for example, an OFDR and/or OTDR type interrogator.

In some embodiments, the reflectometer unit is configured to detect signals reflected due to the native or intrinsic scattering produced by an optical fiber. Examples of such intrinsic scattering include Rayleigh, Brillouin, and Raman scattering. A monitoring system may be configured to correlate received reflected signals with locations along a length of the borehole. For example, the monitoring system is configured to record the times of reflected signals and associate the arrival time of each reflected signal with a location or region of the borehole. These reflected signals can be modeled as weakly reflecting fiber Bragg gratings, and can be used similarly to such gratings to estimate various parameters of the optical fiber or other optical fibers and/or associated components. In some embodiments, the reflectometer may be configured as an interferometer.

Although described above with respect to drilling and/or completion services, those of skill in the art will appreciate that embodiments provided herein are applicable to all downhole operations, including, but not limited to drilling, completion, production, exploration, etc. Further, although various limited examples may be provided herein, those of skill in the art will appreciate that the teachings provided herein are applicable to a wide variety of applications and the examples are merely provided for illustrative and explanatory purposes.

Typically, different types of interrogation technologies and/or properties to be monitored may operate at the same or similar wavelengths. Thus, when two different properties, such as acoustic properties and temperature, are to be measured downhole, separate independent optical fibers must be employed to prevent interference of the signals along the optical fibers. Attaching two sensing systems to the same optical fiber at the same time would cause both functions to fail because the backscatter that different technologies (e.g., acoustic and temperature sensing) produces would be visible to each other. Such interference distorts the signal and causes invalid measurements. Another solution to such issue is to perform the interrogations in series, such that a first unit is connected to an optical fiber to perform a first interrogation, and then the first unit is removed and a second unit is connected to the same optical fiber to perform a second interrogation. In either case, the costs, whether with respect to time and/or equipment, may be high. Thus, improved techniques for performing downhole optical fiber interrogations may be useful.

Figure 3:
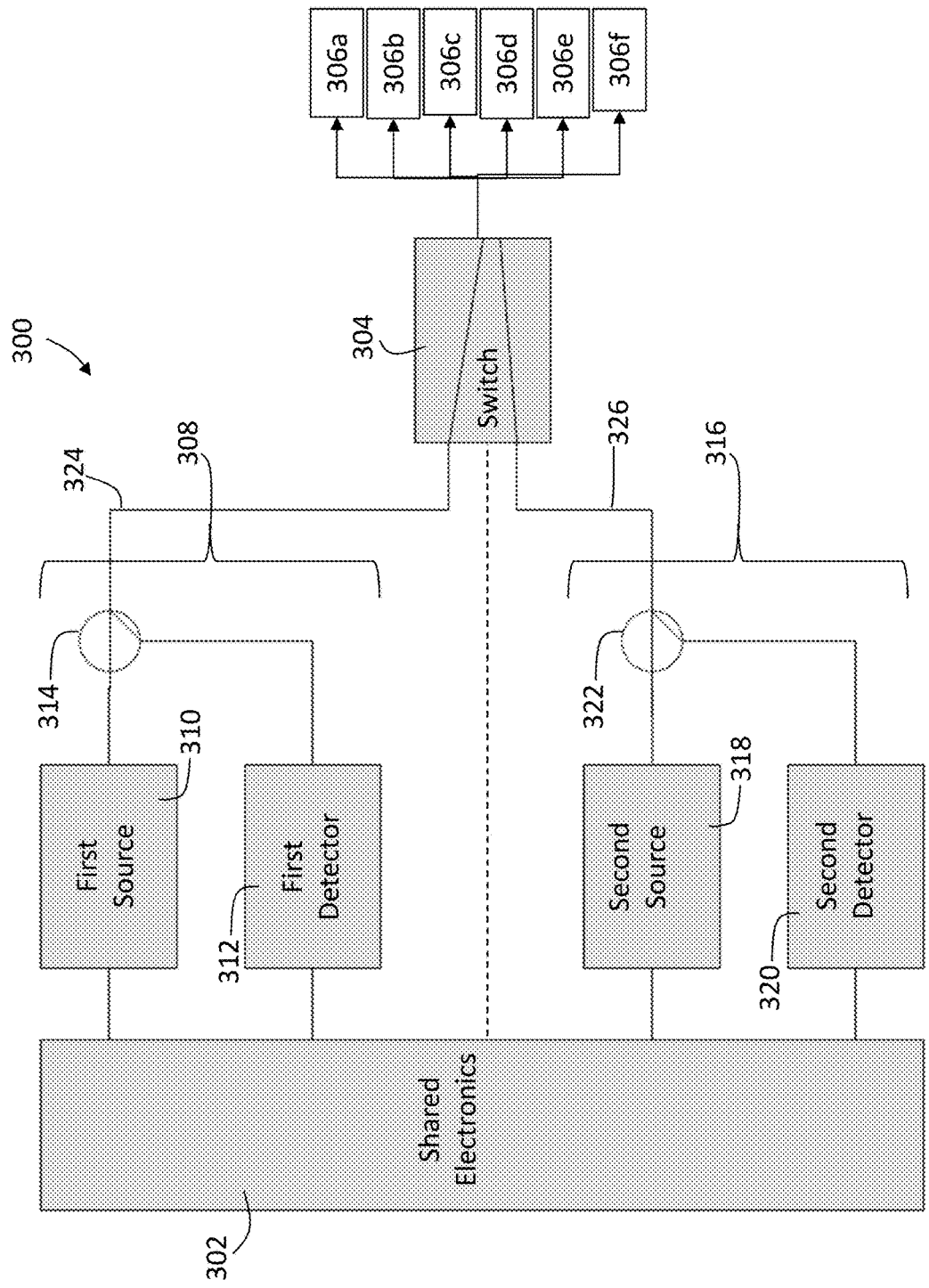
FIG. 3 is a schematic diagram of a downhole fiber optic interrogation system in accordance with an embodiment of the present disclosure.

Turning now to FIG. 3, a schematic illustrative diagram of a downhole fiber optic interrogation system 300 is shown. The downhole fiber optic interrogation system 300 includes a fiber optic control system 302, an optical switch 304, and a plurality of optical fibers 306a-306f that are disposed downhole into one or more boreholes or wells. As shown, located between the fiber optic control system 302 and the optical switch 304 are various sensing systems having sources and detectors. For example, as shown, a first sensing system 308 includes a first source 310 and a first detector 312 that are arranged with an associated first directional optical component 314 are operably connected to the fiber optic control system 302. Similarly, a second sensing system 316 having a second source 318 and a second detector 320 are arranged with an associated second directional optical component 322 that are operably connected to the fiber optic control system 302. The outputs from the first and second sources 310, 318 are passed through the optical switch 304 before being transmitted into one of the optical fibers 306a-306f. Similarly, a reflected signal that returns from one of the optical fibers 306a-306f will pass through the optical switch 304, into the respective directional optical component 314, 322 to be detected at a respective detector 312, 320. In some embodiments, the fiber optic control system 302 can include shared electronics to control, demodulate, calculate, and provide an interface network for both the first sensing system 308 and the second sensing system 316. The directional optical components, in some embodiments, may be a circulator, although other types of directional optical components may be employed without departing from the scope of the present disclosure.

In one non-limiting example, the first sensing system 308 may be a distributed temperature sensing system (DTS) and the second sensing system 316 may be a distributed acoustic sensing system. A distributed temperature sensing system is typically composed of a laser source or sources, an optical fiber that is the device to test, detector optics and circuitry, and an electronics system to control, demodulate, calculate, and provide an interface to a network. Likewise, a distributed acoustic sensing system (DAS) will consist of the same general blocks. The sources (e.g., sources 310, 318) and detectors (e.g., detectors 312, 320) for DTS and DTS units are typically very different, but the optical fibers (e.g., optical fibers 306a-306f) are typical the same in terms of composition, structure, light properties, etc.

Accordingly, the downhole fiber optic interrogation system 300 of the present disclosure enables using a single fiber optic control system 302 to operate as a single system, rather than using two separate and distinct interrogation systems, as is typically done. As noted above, because different sensing techniques or different properties to be monitored may interfere with each other, the optical switch 304 is provided to prevent interference between the different interrogations. The switch 304 thus enables the use of a single unit/system or at least a shared fiber optic control system 302. The optical switch 304 may be an M×N optical switch (where M is the number of sensing systems and N is the number of optical fibers). For example, to multiplex DAS and DTS over shared downhole fibers 306a-306f, the switch 304 is a 2×6 optical switch that is positioned between the output fibers of the DTS and DAS units (first output fiber 324 and second output fiber 326) and the downhole optical fibers 306a-306f. The optical switch 304 is configured and/or controlled so that the first and second sensing systems 308, 316 are never connected to the same downhole optical fiber 306a-306f at the same time. Further, although some light may leak between the connections, the isolation between such connections is large enough to permit operation without interference.

The fiber optic control system 302 includes the necessary electronics for control and operation of each of the connected sensing systems (e.g., first and second sensing systems 308, 316). The fiber optic control system 302 is electrically connected to the various components of the respective sensing system 308, 316, and is further operably connected to the optical switch 304. Thus, the fiber optic control system 302 can control which specific optical fiber 306a-306f that each sensing system 308, 316 is currently connected to. Thus, a single downhole fiber optic interrogation system 300 can be used to perform multiple different types of interrogation and/or sensing without the need for multiple optical fibers disposed in a single well and/or without the need to connect and disconnect different interrogation systems to a single optical fiber.

In operation the fiber optic control system 302 controls operation of the optical switch 304 such that one of the sensing systems 308, 316 is operably connected to one specific optical fiber 306a-306f at a given time. At the same time, the fiber optic control system 302 can control the optical switch 304 to operably connect a different one of the optical fibers 306a-306f. Thus, simultaneous operations may be performed using different optical fibers 306a-306f, thus reducing the amount of time required to perform the sensing or other types of interrogations or data collection from two different types of sensing systems 308, 316. In accordance with embodiments of the present disclosure, the control is a time division multiplex control of the optical switch 304.

Figure 4:
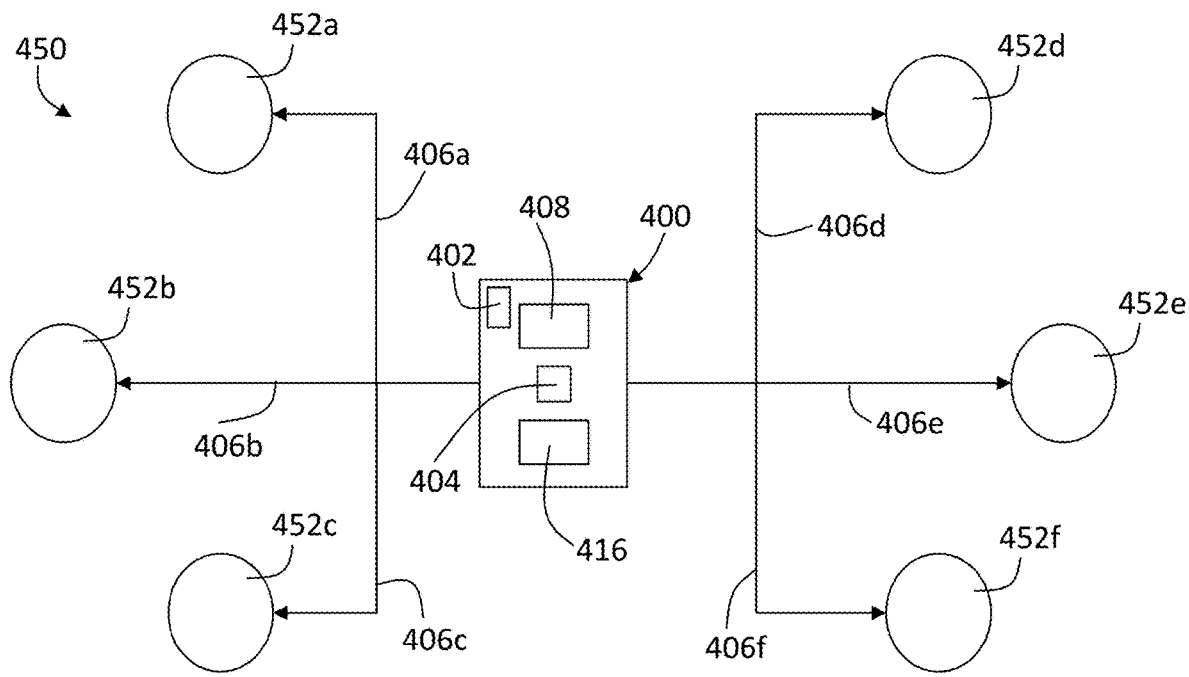
FIG. 4 is a schematic illustration of a multi-well field employing a downhole fiber optic interrogation system in accordance with an embodiment of the present disclosure.

Turning now to FIG. 4, a field array 450 comprising a plurality of different wells 452a-452f is schematically shown. The wells 452a-452f are located at different physical locations in a field and with respect to one or more downhole formations. As shown, a local or centralized downhole fiber optic interrogation system 400 is arranged to enable communication between downhole components, including downhole optical fibers 406a-406f, wherein a given optical fiber 406a-406f is disposed down a respective well 452a-452f. That is, a single downhole fiber optic interrogation system 400 is provided to enable interrogation to each of the wells 452a-452f.

In this embodiment, six different optical fibers 406a-406f are arranged and optically connected to the downhole fiber optic interrogation system 400. The downhole fiber optic interrogation system 400 includes a fiber optic control system 402 housing electronics and control elements. Further, the downhole fiber optic interrogation system 400 includes a first sensing system 408 and a second sensing system 416, similar to that described above. An optical switch 404 is arranged between the first and second sensing systems 408, 416 and the plurality of optical fibers 406a-406f. The fiber optic control system 402 can control the sensing systems 408, 416 and the optical switch 404 such that one of the sensing systems 408, 416 is connected to a specific optical fiber 406a-406f and at the same time the other of the sensing systems 408, 416 is connected to a different optical fiber 406a-406f. Thus, the downhole fiber optic interrogation system 400 enables interrogation to multiple of the wells 452a-452f simultaneously with the different sensing systems 408, 416.

Although described with a single optical fiber 406a-406f disposed within the respective wells 452a-452f, such arrangement is not to be limiting. For example, in some embodiments, multiple optical fibers may be disposed downhole within each of the wells 452a-452f, with each optical fiber operably connected to the downhole fiber optic interrogation system 400 through the optical switch 404.

Although described herein with two sensing systems and six optical fibers, such arrangements are not to be limiting. As discussed above, the optical switch may be an M×N switch, with M being the number of sensing systems and N being the number of optical fibers connected to the optical switch.

Figure 5:
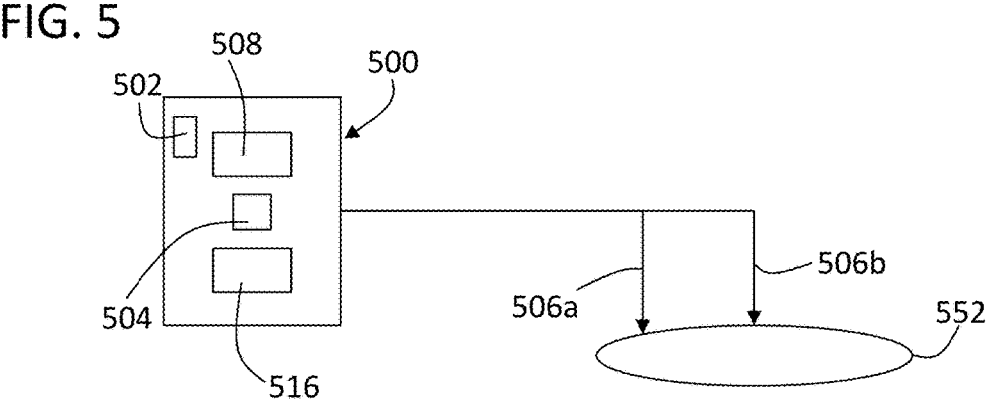
FIG. 5 is a schematic illustration of a downhole fiber optic interrogation system in accordance with an embodiment of the present disclosure having multiple optical fibers disposed in a single well.

Turning now to FIG. 5, a single well 552 is arranged with two separate optical fibers 506a, 506b disposed therein. A downhole fiber optic interrogation system 500 includes a fiber optic control system 502 housing electronics and control elements that are operably connected to the optical fibers 506a, 506b. Further, the downhole fiber optic interrogation system 500 includes a first sensing system 508 and a second sensing system 516, similar to that described above. An optical switch 504 is arranged between the first and second sensing systems 508, 516 and the optical fibers 506a, 506b. The fiber optic control system 502 can control the sensing systems 508, 516 and the optical switch 504 such that the first sensing system 508 is connected to a first optical fiber 506a and at the same time the second sensing system 516 is connected to the second optical fiber 506b. Thus, the downhole fiber optic interrogation system 500 enables interrogation to multiple different optical fibers 506a, 506b simultaneously with the different sensing systems 508, 516, even in the same well.

Figure 6:
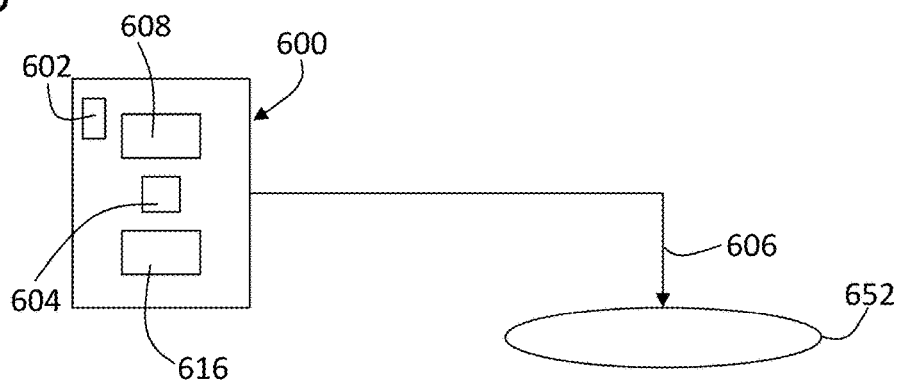
FIG. 6 is a schematic illustration of a downhole fiber optic interrogation system in accordance with an embodiment of the present disclosure having a single optical fiber disposed in a single well.

Turning now to FIG. 6, a single well 652 is arranged with a single optical fiber 606 disposed therein. A downhole fiber optic interrogation system 600 includes a fiber optic control system 602 housing electronics and control elements that are operably connected to the optical fiber 606. Further, the downhole fiber optic interrogation system 600 includes a first sensing system 608 and a second sensing system 616, similar to that described above. An optical switch 604 is arranged between the first and second sensing systems 608, 616 and the optical fiber 606. The fiber optic control system 602 can control the sensing systems 608, 616 and the optical switch 604 such only one of the sensing systems is connected to the optical fiber 606 and at a given time. Thus, the downhole fiber optic interrogation system 600 enables interrogation to a single optical fiber 606 with the different sensing systems 508, 516, even in the same well. It is noted that, advantageously, this arrangement enables an operator to use the single downhole fiber optic interrogation system 600 with two separate sensing systems 608, 616, without the need to change out systems and/or run different optical fibers down the well 652.

Advantageously, embodiments of the present disclosure provide improved downhole sensing and interrogation systems as compared to prior systems. In accordance with the present disclosure, a single downhole fiber optic interrogation system can be operably connected to one or more optical fibers and control interrogation from two or more different sensing systems using an optical switch. Accordingly, cost reductions may be realized with respect to optical fiber interrogation systems, reducing the number of optical fibers deployed, the number of dedicated or discrete sensing systems, and/or through the use of shared electronics and controls, as described herein.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1

A downhole fiber optic interrogation system comprising: a fiber optic control system; a first sensing system; a second sensing system; an optical fiber disposed within a well; and an optical switch arranged between the optical fiber and the first and second sensing systems, wherein the fiber optic control system performs time division multiplex control of the optical switch wherein the first sensing system is operably connected to the optical fiber and the second sensing system is not connected to the optical fiber, and further controls the optical switch such that the second sensing system is operably connected to the optical fiber and the first sensing system is not connected to the optical fiber.

Embodiment 2

The downhole fiber optic interrogation system of any preceding embodiment, wherein the optical fiber is a first optical fiber, the system further comprising a second optical fiber, wherein the fiber optic control system controls which of the first and second sensing systems is operably connected to which of the first optical fiber and the second optical fiber.

Embodiment 3

The downhole fiber optic interrogation system of any preceding embodiment, wherein when the first sensing system is operably connected to the first optical fiber, the first sensing system performs a first interrogation through the first optical fiber, and the second sensing system is operably connected to the second optical fiber, the second sensing system performs a first interrogation through the second optical fiber.

Embodiment 4

The downhole fiber optic interrogation system of any preceding embodiment, wherein the optical fiber is disposed down a single well, wherein the fiber optic control system controls the optical switch wherein only one of the sensing systems is operably connected to the optical fiber at a given time.

Embodiment 5

The downhole fiber optic interrogation system of any preceding embodiment, further comprising five additional optical fibers, wherein the fiber optic control system controls the optical switch such that the first sensing system operably connects to a first of the six optical fibers and the second sensing system operably connects to a second of the six optical fibers.

Embodiment 6

The downhole fiber optic interrogation system of any preceding embodiment, further comprising a plurality of additional optical fibers, wherein each optical fiber of the plurality of optical fibers is disposed down a different well, and wherein each optical fiber of the plurality of optical fibers is connected to the optical switch.

Embodiment 7

The downhole fiber optic interrogation system of any preceding embodiment, wherein the first sensing system is a distributed temperature sensor system and the second sensing system is a distributed acoustic sensor.

Embodiment 8

The downhole fiber optic interrogation system of any preceding embodiment, wherein the first sensing system comprises a first source for transmitting light into the optical fiber through the optical switch and a first detector arranged to detect a reflected light through the optical fiber.

Embodiment 9

The downhole fiber optic interrogation system of any preceding embodiment, further comprising a first directional optical component arranged between the switch and the first source and the first detector.

Embodiment 10

The downhole fiber optic interrogation system of any preceding embodiment, wherein the second sensing system comprises a second source for transmitting light into the optical fiber through the optical switch and a second detector arranged to detect a reflected light through the optical fiber.

Embodiment 11

The downhole fiber optic interrogation system of any preceding embodiment, further comprising a second directional optical component arranged between the switch and the first source and the first detector.

Embodiment 12

The downhole fiber optic interrogation system of any preceding embodiment, wherein the optical switch and an M×N switch, wherein M is a number of sensing systems connected to the optical switch and N is a number of optical fibers connected to the optical switch.

Embodiment 13

The downhole fiber optic interrogation system of any preceding embodiment, wherein the fiber optic control system comprises shared electronics to control, demodulate, calculate, and provide an interface network for both the first sensing system and the second sensing system.

Embodiment 14

A method for interrogating one or more optical fibers disposed downhole, the method comprising: operably connecting a fiber optic control system, a first sensing system, a second sensing system, and an optical switch to the one or more optical fibers; and switching which of the first sensing system and the second sensing system is operably connected to the one or more optical fibers through the optical switch through time division multiplex control.

Embodiment 15

The method of any preceding embodiment, further comprising connecting the first sensing system to a first optical fiber of the one or more optical fibers through the optical switch and simultaneously connecting the second sensing system to a second optical fiber of the one or more optical fibers through the optical switch.

Embodiment 16

The method of any preceding embodiment, wherein the one or more optical fibers comprises a plurality of optical fibers, wherein each optical fiber of the plurality of optical fibers is disposed down a different well, the method further comprising: controlling the first sensing system to operably connect to a first fiber of the plurality of fibers in a first well and the second sensing system to operably connect to a second fiber of the plurality of fibers in a second well.

Embodiment 17

The method of any preceding embodiment, wherein the first sensing system is a distributed temperature sensor system and the second sensing system is a distributed acoustic sensor.

Embodiment 18

The method of any preceding embodiment, wherein the first sensing system comprises a first source for transmitting light into the one or more optical fibers through the optical switch and a first detector arranged to detect a reflected light through the one or more optical fibers.

Embodiment 19

The method of any preceding embodiment, wherein the second sensing system comprises a second source for transmitting light into the one or more optical fibers through the optical switch and a second detector arranged to detect a reflected light through the one or more optical fibers.

Embodiment 20

The method of any preceding embodiment, wherein the optical switch and an M×N switch, wherein M is a number of sensing systems connected to the optical switch and N is a number of optical fibers connected to the optical switch.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

Accordingly, embodiments of the present disclosure are not to be seen as limited by the foregoing description, but are only limited by the scope of the appended claims.

What is claimed is:

1. A downhole fiber optic interrogation system comprising:
a fiber optic control system;
a first sensing system;
a second sensing system;
a first optical fiber disposed within a first well;
a second optical fiber disposed within one of the first well and a second well, wherein each of the first and second sensing systems are operably connected to each of the first and second optical fibers; and
an optical switch arranged between the first and second optical fibers and the first and second sensing systems,
wherein the fiber optic control system is configured to perform time division multiplex control of the optical switch such that, at a first instance, the first sensing system is operably connected to the first optical fiber and the second sensing system is connected to the second optical fiber, and at a second instance, the second sensing system is operably connected to the first optical fiber and the first sensing system is [[not]] connected to the second optical fiber,
wherein, at the first instance, the first sensing system and the second sensing system are configured to simultaneously interrogate the respective first and second optical fiber and, at the second instance, the first sensing system and the second sensing system are configured to simultaneously interrogate the respective second and first optical fiber.

2. The downhole fiber optic interrogation system of claim 1, wherein each of the first optical fiber and the second optical fiber are disposed down a single well.

3. The downhole fiber optic interrogation system of claim 1, further comprising four additional optical fibers, wherein the fiber optic control system is configured to control the optical switch such that the first sensing system operably connects to a first of the six optical fibers and the second sensing system operably connects to a second of the six optical fibers.

4. The downhole fiber optic interrogation system of claim 1, further comprising a plurality of additional optical fibers, wherein each optical fiber of the plurality of additional optical fibers is disposed down a different well, and wherein each optical fiber of the plurality of optical fibers is connected to the optical switch.

5. The downhole fiber optic interrogation system of claim 1, wherein the first sensing system is a distributed temperature sensor system and the second sensing system is a distributed acoustic sensor.

6. The downhole fiber optic interrogation system of claim 1, wherein the first sensing system comprises a first source for transmitting light into a selected optical fiber through the optical switch and a first detector arranged to detect a reflected light through the selected optical fiber.

7. The downhole fiber optic interrogation system of claim 6, further comprising a first directional optical component arranged between the optical switch and the first source and between the optical switch and the first detector.

8. The downhole fiber optic interrogation system of claim 6, wherein the second sensing system comprises a second source for transmitting light into the selected optical fiber through the optical switch and a second detector arranged to detect a reflected light through the selected optical fiber.

9. The downhole fiber optic interrogation system of claim 8, further comprising a second directional optical component arranged between the switch and the first source and between the optical switch and the first detector.

10. The downhole fiber optic interrogation system of claim 1, wherein the optical switch and an M×N switch, wherein M is a number of sensing systems connected to the optical switch and N is a number of optical fibers connected to the optical switch.

11. The downhole fiber optic interrogation system of claim 1, wherein the fiber optic control system comprises shared electronics to control, demodulate, calculate, and provide an interface network for both the first sensing system and the second sensing system.

12. A method for interrogating at least two optical fibers disposed downhole, wherein each optical fiber is disposed down a different well, the method comprising:
operably connecting a fiber optic control system, a first sensing system, a second sensing system, and an optical switch to the at least two optical fibers;
switching which of the first sensing system and the second sensing system is operably connected to a respective one optical fiber of the two optical fibers through the optical switch through time division multiplex control;
simultaneously, at a first instance, interrogating a first optical fiber of the at least two optical fibers using the first sensing system and interrogating a second optical fiber of the at least two optical fibers using the second sensing system; and
simultaneously, at a second instance, interrogating the first optical fiber of the at least two optical fibers using the second sensing system and interrogating the second optical fiber of the at least two optical fibers using the first sensing system.

13. The method of claim 12, wherein the first sensing system is a distributed temperature sensor system and the second sensing system is a distributed acoustic sensor.

14. The method of claim 12, further comprising:
transmitting light from a first light source into a selected optical fiber of the at least two optical fibers through the optical switch; and
detecting, at a first detector, a reflected light through the selected optical fiber.

15. The method of claim 14, wherein the second concing cyctom compricoc a cocond courco further comprising:
transmitting light, from a second light source, into a second selected optical fiber of the at least two optical fibers through the optical switch; and
detecting, at a second detector, a reflected light through the second selected optical fiber.

16. The method of claim 12, wherein the optical switch and an M×N switch, wherein M is a number of sensing systems connected to the optical switch and N is a number of optical fibers connected to the optical switch.

* * * * *